United States Patent [19]
Hoffmann et al.

[11] Patent Number: 6,052,943
[45] Date of Patent: Apr. 25, 2000

[54] FIBER BARRIERS FOR CONTROL OF AGRICULTURAL PESTS

[75] Inventors: Michael P. Hoffmann; Peter Schwartz, both of Ithaca; Joel M. Baird, Lansing, all of N.Y.

[73] Assignee: Cornell Research Foundation, Inc., Ithaca, N.Y.

[21] Appl. No.: 08/946,747

[22] Filed: Oct. 9, 1997

[51] Int. Cl.⁷ .......................... A01G 13/00; A01G 13/02
[52] U.S. Cl. ................................................. 47/58.1
[58] Field of Search .................... 47/1.5, 5.5, 9, 47/28.1, 32, 58.1

[56] References Cited

U.S. PATENT DOCUMENTS

| | | | |
|---|---|---|---|
| 1,871,050 | 8/1932 | Eveland | 47/58.1 |
| 2,103,607 | 12/1937 | Barber | 47/58.1 |
| 2,749,964 | 6/1956 | Manning | 47/9 |
| 3,914,900 | 10/1975 | Bigelow et al. | 47/9 |
| 4,250,662 | 2/1981 | Rees et al. | 47/58.1 |
| 4,818,585 | 4/1989 | Shipp, Jr. | 47/9 X |
| 4,920,692 | 5/1990 | Kitamura et al. | 47/9 |

OTHER PUBLICATIONS

Hough–Goldstein, J.A. Tests of a Spun Polyester Row Cover as a Barrier Against Seedcorn Maggot (Diptera: Anthomyiidae) and Cabbage Pest Infestations, Journal of Economic Entomology, vol. 80, pp. 768–772, Jan. 1987.

Brugger, K.e.; P. Vol., and C. L. Phillips., 1993, Sucrose repellency to European starlings: will high–sucrose cultivars deter bird damage to fruit?, Ecol. Appl. 3:256–261.

Carruth, L. A., 1966, Experiments for the control of larvae of Heliothis obsolete Fabr. On western Long Island during 1935. J. Econ. Entomol. 29: 205–209.

Chalfont, R. B.; C. A. Jaworski: A. W. Johnson, and D. R. Summer, 1977, Reflective film mulches, millet barriers, and pesticides: Effects on watermelon mosaic virus, insects, nematodes, soil–bornefitngi, and yield of yellow summer squash. 1. Amer. Hort. Sci. 102: 11–15.

Clark, L., and J. R. Mason, 1993 Interaction between sensory and postingestional repellents in starlings: methyl anthranilate and sucrose. Ecol. Appl. 3:262–270.

Conway, D. E.; B. D. McCraw; J. E. Motes; and J. L. Sherwood, 1989, Evaluations of mulches and row covers to delay virus diseases and their effects on yield of yellow squash. Applied Agricultural Res. 4: 201–207.

Fuller–Perrine, L. D. and M. E. Tobin. 1992. A cost–effective methodfor applying and removing bird–exclusion netting in commercial vineyards. Proc. East. Wildl. Damage Control Conf. 5: 1 1 1.

Himelrick, D., Battling the birds: the war without Mesurol. East. Grape Grower and Winerv News (Aug./Sep. 1985):22–25.

Hough–Goldstein, J. A. 1987. Tests of spun pokyester row cover as a barrier against seedcom maggot (Diptera: Anthomyiidae) and cabbage pest infestations. J. Econ. Entornol. 80: 768–772.

Martinez, del Rio, C. 1990. Dietary, phylogenetic, and ecological correlates of intestinal sucrase and maltase activirv in birds. Physiol. Zool. 63:987–101 1.

Mitchell, E. R. 1978. Relationships of planting date to dwnage by corn earworms in commercial sweet corn in north central Florida, Fla. Entomol. 61: 251–255.

Moyer, D. D. 1993. New pitfalls for the CPB. pp. 94–95. In Proc. of the 1993 New York State Vegetable Conference. Syracuse, NY.

Oatman, E. R. 1996. Parasitization of corn earworm eggs on sweet corn silk in southern California, with notes on lanal infestations and predators. J. Econ. Entornol. 59: 830–835.

Perring, T. M., R. N. Royalty, and C. A. Farrar. Floating row coversfor exclusion of virus vectors and the effect on disease incidence and yield of cantaloupe. J. Econ. Entornol. 82: 1709–1715.

Pike, K. S. and D. Allison. 1987. Effects on two spotted spider mites of insecticides applied to sweet corn for control of corn earworm. J. Agric. Entornol. 4: 327–332.

Schalk, J. M., C. S. Creighton, R. L. Fer , W. R. Sitterly, B. W. Davis, T. L. McFadden, and A. Day. 1979. Refleciive mulches influences insect control and yield in vegetables. J. Amer. Hort. Sci. 104: 759–762.

Yudin, L. S., B. E. Tabashnik, W. C. Mitchell, and J. J. Cho. 1991. Effects of mechanical barriers on distribution of thrips ahysanoptera: Thripidae) in lettuce. J. Econ. Entomol. 84: 136–139.

Burbutis, P. et al, 1973, Exclusion as a Means of Control of the European corn Borer in Sweet Peppers, Jnl. of Economic Entomology, vol. 67, pp. 97–98.

Hoffman, M.P., et al., 1991, Area–side pheromone trapping of *Helicoverpa zea* and *Heliothis phloxiphaga* (Lepidoptera: Noctuidae) in the Sacramento and San Joaquini Valleys of California. J. Econ., Entomol. 84: 901–911.

Straub, R. W. and B. Emmett, 1992, Pest of monocotyledon crops, In R.G. McKinlay (ed.) Vegetable crop pests. CRC Press, Boca Raton, Fla. 406 pp.

(List continued on next page.)

*Primary Examiner*—Michael J. Carone
*Assistant Examiner*—Jeffrey L. Gellner
*Attorney, Agent, or Firm*—Brown, Pinnisi & Michaels, P.C.

[57] ABSTRACT

The invention presents the use of non-woven fiber barriers applied to agricultural products or the plants to protect agriculturally or aesthetically valuable plants from damage inflicted by pests of agricultural or ornamental plants. Experiments with these fiber barriers have shown a significant deterrent to both the oviposition and feeding of a varied group of agricultural pests. This pest management strategy will be of significant economic value in the more pest sensitive phases of plant growth. Another positive benefit of the use of this system of pest control is that it may allow the elimination or moderation in the use of pesticides in commercial agricultural operations, home gardens, or the urban environment. In this way alleviating public concerns about the large number of pesticide treatments that agricultural products typically receive.

13 Claims, No Drawings

OTHER PUBLICATIONS

Wells, O.S. and J. B. Loy, 1985. row covers for intensive vegetable production. Univ. of New Hampshire, Cooperative Extension Service.

Hoffman, Michael P., et al, 1991, Area–Wide Trapping of *Helicoverpa zea* and *Haliothis phyloxiphaga* (Lepidoptera: Noetuidae) in the Sacramento and San Joaquin Valleys of California, Journal of Economic Entomology, pp. 902–911.

FIBER BARRIERS FOR CONTROL OF AGRICULTURAL PESTS

FIELD OF THE INVENTION

The invention pertains to the field of the non-chemical control of botanical pests, through the use of fiber barriers. More particularly, the invention pertains to the use of non-woven fibers applied directly to or in the vicinity of plants to prevent or inhibit the oviposition and/or feeding of agricultural pests.

BACKGROUND OF THE INVENTION

With the advent of chemical insecticides in the 1950s, easy control of insect pests appeared to be at hand. However, it soon became obvious that there were significant problems associated with the use of insecticides. Through several decades of use over 500 different arthropodal pests have become resistant to insecticides. This has occurred in addition to the advent of widespread environmental and health hazards associated with the massive use of pesticidal compounds. In addition, many non-target organisms have been adversely affected, and pest resurgence has often occurred because broad-spectrum insecticides have eliminated the natural enemies that had originally helped to keep pest populations in check. To date, however, the protection of agriculturally valuable food and fiber crops from insect, mite, disease, weed, and vertebrate pests in conventional agricultural systems, and the home garden, remains primarily reliant on the continued use and commercial availability of chemical pesticides. For the reasons indicated above, continued reliance solely on conventional pesticides is a questionable strategy for the long-term sustainability of agricultural production. Therefore, alternative strategies for the protection of agriculturally or aesthetically valuable plants are needed.

Current alternatives to conventional pesticides include the strategies promoted by Integrated Pest Management (IPM) programs. These IPM programs advocate the development of biological, cultural, physical and mechanical controls, engineered and inherent host plant resistance, as well as the use of naturally occurring aversive compounds to replace and/or complement the use of pesticidal compounds. This is done with an eye toward enhancing the sustainability of agricultural production. Much of the emphasis in these programs has been placed on the development of biological and cultural control elements, primarily because of increasing resistance by pests to pesticide controls.

However, interest in and development of physical and mechanical barriers and repellents has lagged. Physical controls include the use of heat, sound, light, and radiation to kill pests. Mechanical control is the "reduction of insect populations by means of devices that affect them directly or that alter their physical environment radically" (Pfadt 1978). Mechanical control techniques include the use of handpicking, traps, screens, barriers, sticking agents, and sticky bands.

While some of these techniques are laborious and therefore economically unsuitable for situations other than home gardens, the use of physical barriers can be easily mechanized and made suitable for large-scale farming, as well as the home garden. The concept of using barriers to prevent insect pests from reaching crops is not new. Row covers and reflective mulches have been used extensively to prevent insects from locating crops, either through visual disorientation or acting as simple barriers, as well as for horticultural purposes (Burbutis, P. P., and Lesiwicz, D. S., 1973; Chalfant et al., 1977; Schalk et al., 1979; Wells and Loy 1985; Perring et al., 1989; and Conway et al., 1989). Recently, the use of "trenches" for the trapping of Colorado potato beetles has been shown to be very effective (Moyer 1993). This simple, environmentally sensitive, and exceptionally cost-effective method of controlling Spring and Fall dispersing adult potato beetles has tremendous potential to reduce the need for insecticide use against these pests.

Mechanical barriers such as netting have long been recognized as the most effective method for reducing bird damage to agricultural products such as fruit and vegetable crops (Himelrick, 1985). However, the high cost of materials and difficulty of applying and removing netting have limited the use of this type of barrier to small-scale gardens or research plots. While Fuller-Perrine and Tobin (1992) have developed a cost-effective method for applying netting to trellised vineyards, no practical netting techniques exist for the protection of fruit or vegetable crops on a commercial scale.

Many crops, including cherries, blueberries, strawberries, and sweet corn are plagued by bird pests. Birds are major pests of sweet corn production because they feed extensively on the ear tips, making the entire ear unmarketable. Most barriers investigated to date have been of a solid design (i.e., sheets of woven material, plastic mulches, wire cages, bud caps, etc.), but as described below, it is not necessary to have a solid barrier to prevent pests from reaching the crop or portion of the crop plant to be protected. There are also drawbacks to solid barriers in some situations because they block sunlight penetration, pollination, and water movement necessary for appropriate plant development. In addition, disposal problems could arise. Thus, non-woven barriers, which allow sunlight penetration and pollination, are to be preferred because they have significant pest control capability without adversely affecting plant growth.

In addition, fiber barriers can be constructed in different biodegradable forms that can include: various stable sugar formulas, proteins, cellulose constructs, polyvinyl alcohol, and biodegradable polymers. Dependent upon the substrate and term of protection needed, different barriers, or barriers composed of different compounds, can be constructed. Thus, a short-lived (i.e. 3 weeks before it starts to degrade and/or become ineffectual) barrier may be manufactured for sweet corn that will actually degrade by harvest, thus protecting the ear of corn during the silking period, but disappearing by harvest. Other more long-lasting barriers (6+weeks) may be used around the base of plants (e.g. especially agriculturally valuable crop plants, referred to in this application as "agricultural products") to prevent egg laying (e.g. oviposition) by adult pests such as cabbage maggots. Such barriers will have considerably more stability than conventional foliage applied insecticides which have activity of normally <5 days. Also of substantial benefit is the fact that since these fibers will be made of naturally derived compounds, their breakdown products will be environmentally benign or even beneficial dependent upon the chemical composition of the breakdown product of the applied fibers.

The use of obstructive non-woven fiber barriers to obscure and/or protect plants from pest induced damage is feasible, but may initially be more expensive than insecticide applications in the agribusiness or home garden setting. However, as technology improves and the market becomes wider, cost will decrease to the point of economic feasibility on both the commercial and individual consumer scales. Physical barriers may fill voids in situations where no insecticides are available or where the use of a conventional insecticide is not a viable option. It is also likely that the use of obstructive fiber barriers will find a niche as a new tool in the arsenal of weapons that farmers or home gardeners use to stop or inhibit agricultural pests. That is, obstructive fiber barriers may also be used in combination (e.g. fibers applied in conjunction with common pesticides) with other measures to prevent damage to agricultural produce. The fibers themselves may also be used as a platform for maintaining the activity of a given pesticide compound, sensory repellent, or even biological control element such as *Bacillus thuringenesis*, on or near a plant far longer than would otherwise be possible. This possibility would reduce the overall use of insecticides on agricultural produce while enhancing their effectiveness.

Another positive feature of the use of fibers themselves in pest prevention is that the use of fiber barriers does not require registration like insecticides, so use could not be delayed by an extensive regulatory process. In addition to being a physical barrier to birds and insects, fibers made from polysaccharides may themselves act as repellents because some bird species have difficulty digesting sucrose (Martinez del Rio 1990; Clark and Mason 1993). Frugivorous birds such as starlings, *Sturnus vulgaris*, and American robins (*Turdus migratorius*) lack the digestive enzyme sucrase, avoiding mixed sugar types in the foods they select (Brugger et al., 1993).

Currently, there are few alternatives to the use of insecticides for the effective control of the corn earworm in sweet corn. The release of biological control agents, such as Trichogramma are typically not effective (Oatman 1966) and are clearly incompatible with current heavy insecticide use patterns. Silk clipping (Carruth 1936) or application of the biological control agent *Bacillus thuringensis* in combination with mineral oils can be effective but have only been practical on small acreage's. Several types of pest/vegetable crop situations should be amenable to control by fiber barriers, and these include among others: (1) moths which lay their eggs directly on the plant surfaces, (2) maggot adults (flies) which lay their eggs in the soil at the base of the plants, and (3) beetles which feed directly on the newly emerged foliage. Examples of these types of pest/crop situations follow:

The corn earworm is an example of a moth whose egg-laying behavior on plant tissue can be modified through the use of fiber barriers. Because females deposit up to 85% of their eggs directly on the silks of silking corn, it is very difficult to control the larvae, which quickly bore through the silks, and into the ear, where they are protected from most insecticides. Frequent applications of insecticides are required to kill larvae during the 2 to 3 week larval period when ears are most susceptible to damage from this pest. For example, on Long Island, where Lepidopteran (i.e. corn earworm, European corn borer and Fall armyworm) infestations are the most severe in New York State, it is not unusual for growers to make 12 to 14 insecticide applications per planting. This insecticide application is frequently at two to three day intervals during the silking stage of sweet corn development, and reflects an extremely heavy and expensive investment in the use of chemicals.

Similar insecticide use patterns are also common in many other areas, especially in those areas economically dependent upon agricultural production. In Florida, sweet corn fields in silk during peak flights of corn earworm can be treated with 20 or more applications of insecticide over the developmental period of the corn (Mitchell 1978). This heavy insecticide use leads to high ecological and economic costs, and has lead to secondary pest outbreaks of two-spotted spider mites (Pike and Allison 1987). The development of insecticide resistance in target pests is a continuing and growing threat to agriculture around the world (Straub and Emmett 1992). Because of the high use of insecticides in corn and the resulting economic and environmental costs, fiber barriers may be an economically viable alternative to frequent application of insecticides.

Insect pests which lay their eggs at the base of the plant and whose larvae feed on the roots of seedlings are particularly troublesome to growers and usually require prophylactic treatment with synthetic insecticides to the base of the plant or incorporated into the soil at planting to combat crop loss. Such applications are often subject to leaching and are of concern for ground water contamination. The main pest complex, which attacks crop roots, are the various species of maggots. Adult flies are normally attracted to the plant species by visual and chemical cues and lay their eggs at the base of the stem. Larvae develop from the eggs and burrow into the roots. Examples include the cabbage maggot, which feeds on a host of cruciferous crops (broccoli, cabbage, cauliflower, etc.,), the onion maggot, which feeds on onions and closely related crops, and seed corn maggots, which feed on a host of crops including beans and corn. Damage to seeds and roots from these pests may result in death of the plant, diminished yields, or unmarketable roots (i.e. turnips). Because of the similar size and behavior of these maggot pests, it is likely that one type of fiber barrier would be suitable for a host of crop/pest situations and constitutes a large market for the various embodiments of this invention.

Cucumber beetles are the most important direct feeding pests of the cucurbits (cucumber, squash, pumpkin, etc.). These pests are especially difficult for organic growers to control because of their limited options. Colorado potato beetles feed directly on a number of solanaceous crops including tomatoes and potatoes. In both cases, these pests feed on the newly emerged, and very susceptible plants. The goal therefore should be to develop the means, such as non-woven fiber barriers, that are capable of disrupting a given pests ability to find or feed on the leaves or root system of a marketable product (e.g. including the roots themselves). In addition, physical barriers with or without non-toxic pest repellents could provide growers of sweet corn and other crops with substantial gains in overall yield due to a reduction in pest initiated crop destruction or unmarketability.

Few examples of previous efforts with obstructive fiber barriers exist in the literature. Carruth (1936) was one of the few reports in which barriers were tested for control of corn earworm. He compared silk clipping, screen wire protectors, perforated and unperforated bags and insecticides. Most barriers he tested resulted in better control than the insecticides of the day, and none greatly affected pollination. He also studied the use of large enclosures to prevent moth access to sweet corn. Although effective, the barrier treatments were labor intensive and/or expensive to maintain. Likewise, Burbutis and Lesiwicz (1973), found enclosures made of polypropylene netting to be effective in control of European corn borer in sweet pepper. Moreover, pepper yields were found to increase when grown under the enclosures.

Most work with barriers has been directed at disease-vectoring pests (i.e., aphids) using various woven fabric-type materials and reflective mulches or row covers (see references above). For example, Yudin et al., (1991) investigated the effects of barriers on the distribution of thrips in lettuce and Hough-Goldstein (1987) studied the effectiveness of spun polyester as a barrier against seed corn maggot and Lepidopteran pests of cabbage. The latter studies showed a dramatic reduction in worm damage to cabbage under the polyester.

SUMMARY OF THE INVENTION

This invention presents the use of, electrostatically spun, melt-extruded and other fiber types for use as physical barriers for the protection of a wide variety of food crops against a very diverse group of agricultural pests. The experimental use of these fiber barriers has proven a significant deterrent to both the oviposition and feeding of insect pests.

Initial experiments concentrated on the use of fiber barriers for control of insects infesting vegetables because these high value crops may be most amenable to this control tactic during the more economically precarious young plant or fruit maturation phase of development, and because of public perceptions about the disproportionately large usage of insecticides on vegetable crops. This technology also has the potential for use on many other crops, some on a larger scale, such as protection of cotton against cotton bollworm and pink bollworm.

Modifications of the obstructive barrier concept will create more creative and extensive applications, including the addition of a sticker agent to the fibers, the use of spider silk fibers (e.g. or other biological compounds), and using larger fibers to simulate oviposition substrates (i.e., corn silk), or using fiber types that vary in their compositions together for an application. Considering the well-documented problems associated with conventional insecticides, this novel type of pest control promises exceptional results for agribusiness and the urban environment. The advantages of this environmentally benign tactic are many. For example, the use of fiber barriers to control the corn earworm in sweet corn could dramatically reduce insecticide inputs into this widely grown and valuable crop.

Specifically, the focus has been on the development of non-woven fibers that will obstruct pest activities such as oviposition and feeding. These fiber arrangements could be in a "web" type of sheathe over the body of the plant or in a loosely intertwined form, alternatively these fibers could be "blown" onto the plants to be protected through a variety of machines. The most likely method of plant or plant product envelopment or ensheathement would be for the fibers to be applied directly onto the crop to be protected. Insect inhibition could also be initiated through the use of fibers that decrease pest damage because of their color or other visual factors.

One use of these fibers is to obstruct the egg-laying behavior of female corn earworm moths and in this way prevent the infestation of sweet corn ears. It is possible to apply non-woven fibers to the ear zone of sweet corn, just prior to silking. This action would then prevent egg laying by corn earworm moths and consequent damage to the ear. The barrier would be porous enough to allow for pollination, would adhere to the plant, would withstand environmental conditions, and still protect the ear from infestation.

DESCRIPTION OF THE PREFERRED EMBODIMENT

The overall objective in this field of research was to determine the feasibility of using nonwoven biodegradable fiber barriers (loose arrangements of fibers) to obstruct egg laying, feeding, or the spread of vectorable plant diseases, by agricultural pests. The results indicate that this use of non-woven mechanical barriers is effective for management of agricultural pests.

Data are presented herein in the form of data tables to the exclusion of drawings. These data represent the experimental results found by the inventors, and is included in tabular form at the end of this section detailing the preferred embodiments of the invention. It should be noted that each table is individually numbered (e.g. 1 through 41), and is labeled according to the specific data it contains. References to these tables and the experiments that they represent are found throughout the specification but the tables themselves are presented in their own appendix for the sake of clarity, continuity, and ease of reference.

The experiments were performed to determine the efficacy of fiber barriers in reducing feeding damage or oviposition (egg laying) by insect pests. These represent different aspects in the overall experiment embodied by this specification. In feeding damage and oviposition studies, many insects were initially tested in "choice" and "no choice" conditions with regard to their approach to specific types of fiber barriers. Insect pests were presented with a known food source for that species of insect, and data were developed with regard to the amount of feeding damage inflicted or the rate of oviposition on the offered plant in the laboratory, the greenhouse, and in field trials. Methodology of approach, as well as results of tests of the susceptibility of various plants to insect damage with regard to the use of non-woven fiber barriers of various types, colors, and densities are presented.

Laboratory insect flight tunnels and/or cage studies were conducted to determine the effect of various fiber types and configurations (e.g., density per unit area, distance from plant tissue etc.,) of obstructive barriers in preventing insects from laying eggs or feeding on specific vegetable crops. Several different crop types and pests were utilized. Once the optimal fiber barrier and its placement were determined for a specific pest and crop from the flight tunnel and/or cage tests, that combination was tested under field conditions to determine efficacy in preventing insect oviposition and injury to the given agricultural crops.

EXPERIMENTAL INSECTS

Behavioral bioassay studies of fiber efficacy were performed using field-collected and naturally occurring striped cucumber beetles (*Acalymma vittatum*), spotted cucumber beetles (*Diabrotica undecimpunctata howardi*), Colorado potato beetle (*Leptinotarsa decemlineata*), and flea beetles (Epitrix spp.) as well as laboratory-cultured *D. undecimpunctata howardi*, diamondback moth (*Plutella xylostella*), corn earworm (*Helicoverpa zea*), silverleaf whitefly (*Bemisia argentifoli*), imported cabbageworm (*Pieris rapae*), and cabbage maggot (*Delia radicum*).

EXPERIMENTAL DESIGN AND STATISTICAL ANALYSIS

All the experiments related below were arranged in a complete randomized block design where appropriate and data analyzed using SuperAnova™ (Abacus Concepts, Inc. 1989). Where subsamples were taken within the same cage, cage treatment means were analyzed. Means testing was performed with Fisher's LSD to discern differences between treatments. As appropriate, data were square root transformed and proportions arc/sine square root transformed prior to analyses.

CHOICE VERSUS NO CHOICE TESTS

In the experiments run, the insect pests were presented with food sources that they recognize and are known to eat or oviposit on. "Choice Tests" or "No Choice Tests" were developed so that data regarding the effectiveness of fiber barriers could be obtained. These tests are the source of much of the relevant data discussed in this specification, and laid out graphically in the tables attached hereto.

No Choice Tests "No Choice" tests refer to the use of the various barriers on all the host plants available to the insect pest. That is, the insects were presented only untreated plants or only treated plants.

Choice Tests "Choice" tests refer to the availability of the normal plant host of the insect pest both with and without the placement of fiber barriers in the same environment or test conditions.

FIBER TREATMENTS

Five "off-the-shelf," multifilament fibers (tows) were used in tests: (1) a 900 denier Spectra polyethylene fiber (20 μm diameter fiber, 120–150 monofilaments per strand, Allied Corporation, New York, N.Y.), 2) a smaller diameter graphite fiber (6–7 μm diameter, 3000 monofilaments per strand), 3) a 840 denier polyester fiber in six colors (white, red, blue, green, yellow and burgundy), 70 monofilaments per strand; (Allied Corporation, New York, N.Y.); 4) the constituent filaments of ajute twine, and 5) a 1280 denier, black Unitaka polyester fiber (Unitaka).

A length (in cm) of tow was specified as a repeatable measure of fiber density for these experiments. All "off-the-shelf" fiber treatments used in trials were applied by carefully teasing individual fibers from a multifilament tow of a specified length (cm) and, therefore, density of fiber and placing them on the plant, plant part or the soil around the plant to be protected. The amount and length of tow or density of yarn (composed of X number of filaments) cut, teased apart and placed on plants for barrier testing (e.g., a density of 2×1 cm=two, 1 cm lengths of tow composed of, approximately 70 filaments).

Placement of experimental fiber treatments was either around the seedling base (e.g., Acalymma, Diabrotica, Delia, and Leptinotarsa experiments), in a teased layer, covering the entire seedling (e.g., Epitrix, Plutella, Pieris, and Bemesia experiments) or teased over the silks of sweet corn (e.g., Helicoverpa experiments).

A sixth fiber, an electrostatically-spun, polyvinyl alcohol fiber, was applied directly to test seedlings in some laboratory and greenhouse trials by electrically charging a polymer solution with the plant as a ground (e.g., polyvinyl alcohol fibers form a "web" of 0.5 μm fibers around the seedling). A seventh fiber, a spun sucrose "cotton candy," was also applied to all surfaces of a test plant using a wooden dowel to prevent contamination. An eighth fiber, a melt and extruded ethylene vinyl acetate was applied and/or draped over test plants. Other fibers that would be of use would include biological compounds or protein polymers.

EXAMPLE 1

Efficacy of Various Fiber Barriers to Reduce Feeding Damage to Plants

Squash—Acalymma and Diabrotica spp.
Laboratory
Methods and Materials

Striped and spotted cucumber beetles were held in polystyrene containers (18.4×13.3×10.2 cm) under a 16:8 light:dark cycle and 15–20° C. ambient temperature. Beetles were provided with fresh cut cucurbit foliage daily as a food source and harborage along with a water source in the form of a dental wick placed into a small, closed petri dish with water. Thirty minutes prior to testing, beetles were removed, and placed in 4 dram glass vials and allowed to acclimate to ambient test conditions. Laboratory behavioral experiments using both species of cucumber beetles were performed under a combination of fluorescent light, incandescent light and daylight at 22° C., under a 16:8 light:dark cycle. Laboratory arenas for Acalymma and Diabrotica were the same polystyrene boxes containing a single, squash seedling (with two cotyledons) planted in a greenhouse potting mixture. Control arenas housed plants, Waltham Winter squash-var. "Butternut" and summer squash-var. "Seneca", without fibers, while fiber treatments were each applied to different plants in similar arenas. The arenas were covered with rectangular, 0.16 cm thick, clear Plexiglas to facilitate observations and minimize air current interference and/or fiber movement.

Individual beetles were transferred from vials to the potting soil surface and allowed to move freely about the test arena. The 20-minute observation period for behavioral recording could be extended if necessary (e.g., the beetle was in contact with the fiber barrier or in partial contact with the plant). The observation period was terminated when the beetle's body was in full contact with the plant (i.e., plant acquisition). While all beetles were observed until plant acquisition, or at least 20 minutes, only the behavior of those beetles, which attempted to reach the seedling, was included in the analyses. At the end of each observation period, beetles were individually placed in vials containing 95% ethanol and later sexed. Laboratory experiments were replicated at least 15 times for the control and each treatment using different Acalymma to minimize the effect of previous experience. Total observation time and the duration of individual behavioral events were recorded (seconds) along with data on certain behavioral parameters. The behavior of individual beetles when confronted by fiber barriers was characterized by four repeatable and quantifiable parameters that allowed us to assess fiber treatment efficacy for data analysis: total time, approach, time per approach and number of repels. These parameters are defined below.

Total time: Total time during the ≦20 minute observation period during which the insect was in contact with fiber barrier or within 2 cm radius of the stem of a control plant. Timing continued until the insect left the timing radius, broke off contact with the barrier or acquired the plant (i.e., attains full, unobstructed contact with the plant surface).

Approach: Insect, moving in a goal-oriented fashion, makes contact with fiber barrier or enters the 2-cm radius thereby initiating the timing of contact. Data from insects, which failed to "approach" the test plant, were not used in any analyses.

Time/Approach: Total time divided by the number of observed approaches. The insect, although having recorded one or more approaches, is never able to acquire the plant during the observation period.

Greenhouse

Two arena types were used in the greenhouse experiments. First, polyethylene, 2-liter soda containers that had been separated from their bases, had their mouths removed, had a square window cut and had both openings covered with fine mesh fabric. An access hole was cut for the introduction of test insects and sealed with foam plugs. A 3.81 cm dental wick, soaked in a 10% sucrose-water solution and inserted into the foam plug, was provided to the experimental insect in each arena. A single squash seedling was planted in greenhouse potting soil within the base and the clear section of the bottle was inverted and slid within the base to enclose the arena for Acalymma and Diabrotica experiments. Control plants received no treatment while experimental plants received a cover of a specified length/density of graphite or polyester multifilaments. For choice tests with multiple plants, including tests of fiber color effects, rectangular (30.48×60.96×30.48 cm) or square (45.72×45.72×45.72 cm) screen cages were arranged to house planting trays containing 4 or 5 seedlings in greenhouse potting soil. Greenhouse studies for all test species were performed under a combination of daylight and incandescent grow light and ambient temperatures ranging between 23.5 and 34° C. and a 16:8 light cycle.

Individual or groups of three to five cucumber beetles of undetermined sex were introduced into each polyethylene arena containing a treated or untreated seedling. The insects were allowed to move freely about each container for at least 24 hours but, in some trials, up to 72 hours, then removed. Beetles were then preserved in alcohol to be later sexed. To determine damage (the area of leaf material removed by beetles) in each replicate, each cotyledon was removed, traced on paper to its perceived pre-test area, and along with this tracing, measured with a calibrated LC3 leaf area meter (LiCor, Inc., Lincoln, Nebr.). The difference was recorded as leaf tissue loss. In addition, areas of each cotyledon which were scoured by beetle feeding, rather than fully removed, were removed by scalpel or insect pin and the leaf area re-measured to assess real tissue damage. At least ten replicates each of the control, low fiber treatment (3×5 cm length of fiber), medium fiber treatment (6×5 cm length of fiber) and high level (9×5 cm length of fiber) graphite for density, 3×5 cm lengths of graphite and polyethylene with PVA treated plants for fiber type or blue, red, green, yellow and white polyester for color trials were performed.

Field

Field choice tests, were performed without cages using cotyledon-age summer squash seedlings raised under greenhouse conditions which were transplanted directly within mature, pumpkin plots with pre-existing natural populations of beetles. Transplanted squash cotyledons were placed in rows with 1.21 m spacing between rows and plants within rows (control and either 3 or 4 treatments). Beetles were allowed to feed for 48 hours with behavior observed periodically. At the end of that time, beetles were removed from the seedlings and the feeding damage assessed visually and then the plants were returned to the laboratory, in soil to prevent desiccation, and the cotyledons measured with a calibrated leaf area meter. The start date for field trials was 9/5/96 for both density and color choice. Meteorological parameters including precipitation, wind velocity and temperature, collected within 500 meters of experimental cages, were monitored during all field trials.

Potato—Leptinotarsa

Laboratory/Greenhouse

Seed potatoes, stored in a cooler and brought to 28° C. temperature for one week, were cut by hand and placed in six-packs with potting mix in a greenhouse and allowed to sprout seedlings. Laboratory and greenhouse protocols and arenas for Leptinotarsa were the same as those used for Acalymma and Diabrotica above, containing one (for behavioral experiments) or more (choice experiments) potato seedlings planted in an approximately flat-surfaced matrix of greenhouse potting mixture. Behavioral and leaf damage studies were performed under a combination of daylight and incandescent grow light and ambient temperatures ranging between 23.5 and 34° C. and a day length of 16:8.

Field

At the start of a field trial, ten small cages (blocks) were each erected over 5 transplanted potato seedlings in two alternating rows with 30.5 cm spacing between both rows and plants within rows (control and 4 treatments). Beetles for field trials were transported from the laboratory in screened cages held in a cooler. Meteorological parameters including precipitation, wind velocity and temperature, collected within 500 meters of experimental cages, were monitored during all field trials. Ten adult Leptinotarsa were released into each cage and allowed to feed for 24 hours with behavior observed periodically. At the end of that time, beetles were removed and the feeding damage assessed visually and then the plants were returned to the laboratory, in soil to prevent desiccation, and the cotyledons measured with a calibrated leaf area meter as described above. Start dates for field trials were June 30 and July 3 for density choice and Jul. 11, 1996 for color choice.

Radish—Epitrix

Greenhouse

The response of flea beetles to fiber barriers was tested with the treated and untreated radish var. "Champion." The same arenas were used for flea beetle studies as for other beetle behavioral studies described above, with a 10:4 sand/top soil mixture as a planting matrix and light colored background so that the movement of the beetles could be observed. Twenty arenas, 5 of each treatment (untreated, polyethylene, graphite and PVA) were run simultaneously under identical ambient conditions. For Epitrix trials, individual beetles were not observed individually due to their small size and high mobility. Instead, acquisition by any of the beetles, was monitored and recorded every 10 minutes for the first hour and at two 30-minute time points in the second hour.

Example 2

Results of Feeding Damage Trials

Squash—Acalymma and Diabrotica spp.

Under no choice conditions all spotted cucumber beetle behavioral parameters showed significant responses to fiber treatments. Significant differences were recorded between the mean total contact time for untreated and fiber treated winter squash plants (p=0.023; Table 1). Likewise, number of approaches (p=0.0004, range: control=1.00±0.00 versus high density 3.10±0.50), time in contact with fibers per approach (p=0.030), and the proportion of unsuccessful plant acquisitions or repels (p<0.001; Table 2) were significantly different. These parameters were not statistically different between each sex (p=0.588–1.000), determined a posteriori through dissection.

When spotted cucumber beetles were given a choice, no significant differences in leaf damage were observed between untreated squash and squash treated with 3×5 cm graphite or 3×5 cm polyethylene (p=0.212) in fiber type comparisons. Likewise, no particular polyester fiber color (red, blue, green, white, or yellow) significantly deterred feeding by spotted cucumber beetles (p=0.194). Mixed groups of beetles containing both sexes, determined a posteriori through dissection, caused significantly more proportional squash leaf damage (chew, p=0.042; chew+scour, p=0.005) than do same-sex groupings in fiber type choice experiments.

Under no choice conditions fiber density had a significant influence on behavioral parameters such as time in contact with the fibers or time striped cucumber beetles were within 2 cm of stem (p<0.001; Table 3), approach (p<0.001; Table 4), time in contact with fibers/approach (p<0.001; Table 5)

and the proportion of unsuccessful plant acquisitions (p<0.001; Table 6). Fiber type had a significant influence on parameters such as total time (seconds) in contact with the fibers or within 2 cm of stem (p=0.0001; Table 7), approach number (p<0.001; Table 8), time in contact with fibers/ approach (p<0.001; Table 9), and the proportion of unsuccessful plant acquisitions (p<0.001; Table 10). The feeding damage data for laboratory density choice experiments suggests no significant deterrent to feeding attributable to fiber treatments (p=0. 181). Field graphite density choice studies (untreated, 1×5, 3×5, 6×5 and 9×5 graphite tow) exhibit a significant reduction in mean leaf damage (p=0.012; Table 11) and proportional leaf damage (p=0.007; Table 12) with increasing density. This was inconsistent with some of the earlier laboratory results. Fiber type (untreated, 3×5 cm polyethylene, graphite and jute fibers) produced no significant differences in actual (p=0.357) or proportional (p=0.265) leaf damage between treatments. Because these field experiments were uncaged, damage may be due to not only to Acalymma but also to Diabrotica spp., (*D. virgifera virgifera, D. barberi* and *D. undecimpunctata howardi*) which also feed on squash and are active in the field simultaneously.

Potato—Leptinotarsa

Under "No Choice" conditions fiber density had a significant influence on total time (seconds) Colorado potato beetles were in contact with the fibers or within 2 cm of stem (p<0.001; Table 13), number of approaches (p<0.001; Table 14), time in contact with fibers/approach (p<0.001; Table 15) and the proportion of unsuccessful plant acquisitions (p<0.001; Table 16). Fiber type also had a significant influence on total time (seconds) (p=0.007; Table 17), approach number (p=0.0207; Table 18), time in contact with fibers/ approach (p=0.032; Table 19), and the proportion of unsuccessful plant acquisitions (p<0.001; Table 20).

Under greenhouse choice conditions, fiber treatments reduced feeding damage in terms of actual leaf area removed by chewing (p=0.002; Table 21) and the proportion of the leaf damaged (p=<0.001; Table 22) with all treatments showing less damage than the control. No significant differences (p>0.75) were observed in laboratory color choice trials (blue, green, red, white and yellow polyester). There was no significant effect attributable to sex of the beetle, as determined through a posteriori dissection. Field studies comparing graphite fiber densities also showed a reduction in feeding damage in terms of actual leaf area removed by chewing (p<0.001; Table 23) and the proportion of the leaf damaged (p<0.001; Table 24).

Radish—Epitrix

Beetles presented with a single, untreated or treated 3×5 cm graphite, polyethylene or electrostatically applied polyvinyl alcohol) radish seedling in no choice arenas differed significantly in their time course of plant acquisition. These differences between treatments occurred at 20 (p<0.001) and 30 (p<0.001) minutes after experiment initiation (Table 25). At other experimental times the beetle numbers are not significantly different among treatments. When the mean total number of observed beetles on plants for each treatment were analyzed, no significant differences were observed (p=0.558). However, for the proportion of the leaf damaged (p=0.025, proportional mean damage ±se: control= 0.17±0.05, polyethylene=0.13±0.04, graphite 0.05±0.02, PVA=0.23±0.04), PVA treatment significantly enhanced damage over the control and all other treatments. This was consistent with the rapid beetle buildup on PVA-treated plants during the experiments.

Example 3

Efficacy of Various Fiber Barriers to Reduce Oviposition

Broccoli—Plutella and Delia

Greenhouse

Methods and Material

Laboratory-cultured diamondback moth pupae, placed in 12.07 cm diameter polystyrene containers and cabbage maggot pupae in 30.48×30.48×30.48 cm screen cages, were held under a 16:8 light cycle and 24° C. ambient temperature until eclosion. Adults of both sexes were then held together, under like conditions for at least 4 and 7 days, respectively, to allow both sexes to reach sexual maturity and mate. Adult insects were provided with a 10% sucrose-water solution ad libitum and cabbage maggots were additionally provided with a powdered baker's yeast mixture, as a protein source. Individuals were transferred to capped 4-dram glass vials before final transfer to test arenas. Laboratory and greenhouse arenas for Plutella and Delia were the same as those used for Acalymma and Diabrotica above, containing one (for behavioral experiments) or more (choice experiments) broccoli seedlings, hybrid broccoli-var. "Premium Crop" or var. "Southern Comet," planted in a greenhouse potting mixture.

Fiber treatments were teased out over the seedlings (Plutella) or around the base of the seedling on top of the soil (Delia). Individual or multiple females of ovipositional age were used. The assessment of oviposition in Plutella involved the counting of eggs on individual seedlings in three areas (i.e., top and bottom of leaves including petiole and on the stem, i.e., below the petiole insertions) and on the fibers in the treated arenas. Determination of Delia oviposition involved the careful removal of each sub-container of substrate and placing them individually in water-filled containers. This allows the substrate to sink while the eggs in each container float and can be easily counted. Blocks (control+treatments) without eggs laid on control plants (Plutella) or within control containers (Delia) were not included in the analyses.

Field

For field experiments involving Brassica, ten small cages (blocks) were erected over 5 transplanted (Plutella experiments) or potted (Delia experiments) broccoli seedlings in two alternating rows with 30.48 cm spacing between rows and plants within rows. For Plutella experiments, greenhouse-grown broccoli seedlings (with two cotyledons) were removed from a matrix of greenhouse potting mixture and planted directly into the soil within the cages. For Delia, broccoli seedlings were planted in potting mixture in 12.7-cm diameter standard pots to a depth of at least 3-cm below the rim. A 3 cm layer of a 10:4 mixture of #1 sand/topsoil was then placed over the top of the potting mixture containing the growing seedling as an oviposition substrate.

The five potted plants per cage were buried so that the brim of each pot was even with the surrounding soil. A 10% sucrose-water solution was provided in each cage along with a powdered brewer's yeast mixture in the Delia trials. Within each cage for choice tests, a single replicate of a control and four fiber treatments were applied (5 plants total). The behavior of caged insects (5–10 adult females/trial) was observed periodically to assess setup and insect viability. After 72 hours, the insects were removed and oviposition was assessed. For Plutella, number and position of eggs on each plant was measured. Start dates for field trials were July 18 and June 31 for density choice and August 6, August 14 and Sep. 18, 1996 for color choice. For Delia, the sand/topsoil mixture was removed and the eggs counted after flotation in water. Start dates for field trials were June 3 and Jun. 10, 1996. Blocks (control+treatments) without eggs deposited in control plots were not included in the analyses. Meteorological parameters including precipitation, wind velocity, and temperature, collected within 500 meters of experimental cages, were monitored during all field trials.

Sweet Corn—Helicoverpa

Greenhouse

To initially determine the spatial oviposition pattern of Helicoverpa on untreated sweet corn, four potted greenhouse-grown sweet corn plants, var. "Horizon," in the silking stage with tassels and stems removed from about 30.48 cm above the silking ear, were placed in a wooden-framed, enclosed cage with a plywood bottom. The sectioned stem of each plant was sealed tightly with parafilm™ (American National Can, Neenah, Wis.) to prevent desiccation and moderate volatile release. Four plants in each cage for fiber trials were treated by teasing out monofilaments over the silks of randomly assigned plants. Two pairs of unmated, but reproductively mature, male and female moths were released together in the oviposition cage for 96 hours. At the end of the experiment, the moths were removed and the position (stem, leaf, ear, silks and fibers if present) and number of eggs were recorded. Ambient temperature and time of day were tracked during laboratory and greenhouse trials. These trials were replicated nine times.

Field

Two sweet corn plantings var. "Horizon," 14 rows wide and 33.5 m in length with a 91.4 cm between-row spacing and 20.32 cm inter-plant spacing were planted on June 3 and Jun. 26, 1996. For field experiments involving Helicoverpa, five natural color HDPE or woven Lumite (Synthetic Industries, Gainesville, Ga.), 20×20 mesh screen cages were fabricated. Each cage was constructed to fit over a 2.9 m wide, by 3.8 m long, by 2.3 m high, 15.2-cm thick PVC frame. Cages were erected over the three center rows of each 7 rows of corn leaving two rows outside the cage on either side to minimize edge effect. Within each cage, all ears of sweet corn were removed from each plant in direct proximity to each the cage walls. All treatments and controls were confined to the ears of plants in the center row contained within this ear-removed buffer zone. Within each cage 16 plants were available, comprising a maximum of 4 replicates of a control and 3 fiber treatments for each cage in a trial. A food source of 10% sucrose-water solution in a vial with a dental wick, sealed with parafilm™ and attached to a 1.8-m stake, was provided ad libitum. The five adult females and five adult male Helicoverpa, previously held together for 5–7 days to accommodate the pre-oviposition period, were released into each cage. Start dates for field trials were August 14, August 20, August 28, September 3 and Sep. 9, 1996. Subsamples (control+treatments) without eggs on the silks of control plants were not included in the analyses. Meteorological parameters including precipitation, wind velocity and temperature (T°), collected within 500 meters of experimental cages, were monitored during all field trials. At the end of the 96-hour experimental period, moths were collected and individual control and fiber-treated plants were surveyed for the presence, number and position of eggs.

Squash—Bemisia

Greenhouse

Whiteflies were tested with a "No Choice" protocol using single treated and untreated summer squash plants var. "Seneca." Two liter, polyethylene soda container arenas holding a single squash plant in a potting soil mixture were used for whitefly studies. Ten mating pairs of whiteflies were introduced into each arena for all studies. Up to forty arenas, depending on the treatment parameters of a given trial, were run simultaneously under identical ambient conditions. Ambient temperature and time of day were tracked during greenhouse trials. The length of each trial was 48 hours, at which point, the whiteflies were removed and the eggs counted on the top and bottom of each cotyledon and true leaf. Counts were made using a binocular dissecting scope.

The fibers for plant treatments were created and/or applied in four ways: 1) PVA fibers were electrostatically spun as a web directly onto squash plants, 2) sucrose cotton candy fibers were spun using a Robson Model CC 1-3701 (Chino, Calif.) cotton candy maker and applied by hand to the top and bottom of each cotyledon and true leaf, 3) "Off-the-Shelf" graphite fibers were teased by hand out at known densities (3×5 cm, 6×5 cm and 9×5 cm) over and around each cotyledon and true leaf and 4) ethylene vinyl acetate (EVA) was melt extruded under pressure into a stream of compressed air to form a fiber web directly onto the squash plant. While EVA, graphite and PVA fibers were relatively stable in greenhouse studies, the sucrose fibers were quickly degraded by moisture and formed a sugar coating of the leaf's surface with numerous raised and stable sugar droplets. This was an expected result and the efficacy of this fiber application was worthy of testing.

Broccoli—Pieris

Efficacy against Pieris (commonly known as imported cabbageworm) oviposition was tested using a Choice protocol with fiber treated and untreated squash plants var. "Seneca." Four 2 liter, polyethylene soda container bottoms, each holding a single broccoli plant in a top soil mixture, were placed in each of five 45.7×47.5×45.7 cm screen cages used as test arenas (blocks). Three of the plants were treated with fibers and the fourth was an untreated control. Treatments were arranged randomly within each cage. Four, reproductively mature female Pieris were introduced into each arena for all studies, given a 10% sucrose solution as a food source and allowed to oviposit ad libitum. Ambient temperature and time of day were tracked during greenhouse trials. The length of each trial was 96 hours, at which point, the butterflies were removed and the eggs counted on the top, bottom and stem of each cotyledon and true leaf and on the fibers for treated plants.

The three fibers for plant treatments were created and/or applied in two ways: 1) ethylene vinyl acetate (EVA) fibers were melt extruded under pressure through a nozzle into a stream of compressed air forming a web that was then placed onto broccoli plants; or 2) either "Off-the-Shelf" graphite or black polyester fibers were teased by hand out at known densities (6×5 cm) over and around each cotyledon and true leaf.

Example 4

Results of Oviposition Trials

Broccoli—Plutella and Delia

Fiber type studies indicate that graphite fibers significantly reduced diamondback moth oviposition at 24 hours when compared with polyethylene-treated and untreated plants (p=0.0097; Table 26). The proportion of females ovipositing was reduced by the graphite fiber treatment (Table 27) along with a significant change in the spatial egg deposition pattern (Table 28). In an additional fiber type trial, electrostatically-spun, PVA fibers did not reduce total oviposition on broccoli seedlings (p=0.257) from that of untreated, polyethylene- and graphite-treated seedlings even though oviposition was lowest for PVA on each plant area and significantly so for the bottom (p=0.005). This was due to the significantly greater egg deposition on the PVA fibers themselves (p<0.001; mean number of eggs±se: PVA= 105.42±27.84, polyethylene=11.27±5.76, graphite= 23.40±8.70). This does not equate to increased plant protection since newly hatched larvae were then able to penetrate the PVA barrier and feed on the leaves. Significantly more eggs were recorded on control plants than those treated with a medium (6×5 cm) or a high (9×5 cm) level of fibers at 3 hr (p=0.0482) and 6 hr (p=0.0231).

In choice studies, color had a significant effect on egg placement, with plants treated with blue fibers less preferred (p=0.040; mean number of eggs±se: blue=0.92±0.61, white= 13.08±5.06, burgundy=9.92±3.89). No significant differences were noted in separate no choice tests of untreated, green and yellow polyester (p=0. 1214). Oviposition was significantly reduced in graphite density choice polyester fibers tests (p<0.001; range of mean number of eggs±se: control=127.33±1.73, 6×5 cm=9.75±6.96) with 3 of 12 blocked replicates exhibiting oviposition only on the untreated plants and 6 of the 12 with oviposition only on untreated and low density treatments. Positional oviposition data (top, bottom, stem, fibers) was also recorded with similar results for each fiber treatment (p=0.0012<0.001).

Field studies testing graphite density (untreated, 1×5, 3×5, 6×5, and 9×5 graphite tow) showed a significant reduction in mean total oviposition with increasing density (p<0.001; Table 29). This was consistent with the results when each plant location (top: p<0.001, bottom: p<0.001, and stem: p<0.001) were considered individually. The number of eggs laid on the test fibers also decreased significantly with increasing density (p=0.046; Table 30). No significant differences (p=0.731–0.089) were observed in field color choice trials (blue, green, red, white and yellow polyester).

Initial greenhouse cage studies of cabbage maggot females showed that 96.4% of all eggs were deposited within 1.25 cm of an untreated host plant. These studies also outlined the behavioral oviposition sequence for Delia, documenting the fly's need for tactile contact with the host plant during its ovipositional sequence. These data were useful in comparisons of oviposition with increasing fiber densities, and other Delia studies. In fiber type studies, graphite fibers significantly reduced oviposition within 1.25 cm of the stem when compared with polyethylene treated and untreated plants (p=0.0126; Table 31).

In addition, the proportion of females ovipositing within 1.25 cm of the stem was reduced, particularly by the graphite treatment, which was responsible for a reduction from 80% for untreated plants to less than 10% (Table 32). In separate laboratory fiber type trials including plants treated with electrostatically-spun PVA fibers, oviposition within the 1.25 cm of the stem was significantly reduced (p=0.027; Table 33). A significantly greater proportion of eggs were deposited within 1.25 cm of an untreated stem than for graphite, polyethylene or PVA treatments (p=0.004). Trials with broccoli seedlings covered with electrostatically-spun, polyvinyl alcohol fibers indicate that as long as the "web" formed by the 0.5 μm fibers remains intact, oviposition by cabbage maggot is prevented. Small rips or tears, in some of our PVA treatments, allowed females to contact the stem and accomplish oviposition. Still the result presents the efficacy of electrostatically spun and biodegradable fiber barriers against cabbage maggot. Oviposition within 1.25 cm of a stem declined significantly with increasing density (3×5, 6×5, 9×5) of graphite fibers (p=0.0043; Table 34). A reduction in total eggs (p<0.001) per female was also noted. The proportion of females ovipositing was reduced by increasing fiber density particularly within the inner 1.25-cm radius (Table 35). Laboratory trials showed no significant effect of color on cabbage maggot oviposition. When given a choice, untreated plants were subject to more oviposition than those treated with fibers (p<0.001; egg mean±se: control= 12.93±3.78, high density=0.53±0.19) and oviposition near the stem than treated plants (p<0.001; egg mean within 1.25 cm±se: control=10.07±3.78, high density 0.27±0.15).

Sweet Corn—Helicoverpa

Greenhouse cage studies in which fibers were teased over silks of the corn suggested that jute might significantly reduce, while graphite fibers significantly enhance oviposition in the area around the ear silks when compared with untreated plants (p=<0.001; oviposition proportion mean+ se: control=0.13±0.05, jute=0.00±0.00, graphite=0.28±0.05; number of eggs 407). Field fiber type studies performed in large cages, showed a significant reduction only in mean proportional oviposition with differing fiber types (p=0.019; Table 36). Despite this apparent deflection of earworm spatial oviposition pattern, both the mean proportion of eggs on the silks and fibers if present (eggs on.silks+eggs on fibers/total eggs on plant+fibers; p=0.955) and the mean total eggs per plant+fibers (p=0.207) exhibited non-significant treatment effects.

Squash—Bemisia

Under no choice conditions all three treatments significantly reduced whitefly oviposition. Significant differences were recorded between the mean oviposition for untreated and graphite fiber treated squash plants (p=0.0001; Table 37) with a steady reduction in the mean total number of eggs with increasing fiber density. Likewise, the total mean number of eggs/plant (p=0.0001, control=24.47±1.88 versus sucrose=5.87±1.96; Table 38) was significantly reduced by sucrose treatment. The results of the PVA trial show a significant reduction in mean total number of eggs laid between untreated and treated plants (p=0.0174, control= 54.89±8.17 versus PVA=30.78±4.83). Significant differences in egg location are statistically supportable, as well (Table 39). Untreated plants exhibited significantly more whitefly oviposition on true leaves (p=0.0016) and significantly less oviposition on the cotyledons (p=0.0001) than untreated plants. No significant differences were observed in whitefly oviposition on untreated and EVA-treated squash seedlings (p=0.940).

Broccoli—Pieris

Under choice conditions, all three treatments significantly reduced the total mean number of eggs/plant (p=0.0002; see Table 40) laid by imported cabbageworm. In addition, ethylene vinyl acetate prevented oviposition significantly better than the "off-the-shelf" treatments, perhaps due to its better coverage of plant tissue. Decreased oviposition was primarily due to significant reductions in the number of eggs laid on the bottoms of the leaves (p=0.0001; see Table 41). Fiber treatments may present particular difficulties for egg laying on the underside of the leaves by eliminating adequate leaf-edge perches.

EXPERIMENTAL DATA TABLES

TABLE 1

The time in contact with fibers per insect aproach as a function of fiber density

| Density | Total time | Standard error |
|---|---|---|
| Control | 2.65 | 0.37 |
| 1 × 5 cm | 67.90 | 24.91 |
| 2 × 5 cm | 99.20 | 47.16 |
| 3 × 5 cm | 68.60 | 15.59 |

TABLE 2

Unsuccessful plant acquisitions (repels) with increasing fiber density

| Density | Proportion of Repels | Standard error |
|---|---|---|
| Control | 0.00 | 0.00 |
| 1 × 5 cm | 0.20 | 0.13 |
| 2 × 5 cm | 0.90 | 0.10 |
| 3 × 5 cm | 0.90 | 0.10 |

TABLE 3

The pests' time in contact with the fibers as a function of fiber density (no choice conditions)

| Density | Total Time (sec) | Standard error |
|---|---|---|
| Control | 1.50 | 0.22 |
| 1 × 1 cm | 18.07 | 3.98 |
| 2 × 1 cm | 63.93 | 24.56 |
| 3 × 1 cm | 64.07 | 10.84 |
| 5 × 1 cm | 109.31 | 20.73 |
| 1 × 5 cm | 138.25 | 26.37 |

TABLE 4

The ability of increasing fiber density to increse the pests' approach to plant patterns (no choice conditions)

| Treatment | Number of Approaches | Standard error |
|---|---|---|
| Control | 1.00 | 0.00 |
| 1 × 1 | 1.50 | 0.13 |
| 2 × 1 | 1.79 | 0.19 |
| 3 × 1 | 2.34 | 0.23 |

TABLE 4-continued

The ability of increasing fiber density to increse the pests' approach to plant patterns (no choice conditions)

| Treatment | Number of Approaches | Standard error |
|---|---|---|
| 5 × 1 | 3.56 | 0.47 |
| 1 × 5 | 3.18 | 0.32 |

TABLE 5

The influence of increasing fiber density on time in contact with fibers (no choice conditions)

| Treatment | Time/ Approach | Standard error |
|---|---|---|
| Control | 1.50 | 0.22 |
| 1 × 1 | 11.16 | 2.54 |
| 2 × 1 | 24.94 | 4.54 |
| 3 × 1 | 22.52 | 2.28 |
| 5 × 1 | 35.64 | 6.70 |
| 1 × 5 | 56.29 | 15.00 |

TABLE 6

Proportion of repels (no plant acquisition) with increasing fiber density (no choice conditions)

| Density | Proportion of Repels | Standard error |
|---|---|---|
| Control | 0.00 | 0.00 |
| 1 × 1 cm | 0.40 | 0.13 |
| 2 × 1 cm | 0.53 | 0.13 |
| 3 × 1 cm | 0.60 | 0.09 |
| 5 × 1 cm | 0.69 | 0.12 |
| 1 × 5 cm | 0.94 | 0.06 |

TABLE 7

Fiber type influence on the time in contact with fibers

| Treatment | Total Contact Time (seconds) | Standard error |
|---|---|---|
| Control | 1.50 | 0.22 |
| Polyethylene | 32.25 | 4.72 |
| Graphite | 77.32 | 8.73 |

TABLE 8

Number of pest approaches to the plant as a function of fiber type

| Treatment | Number of Approaches | Standard error |
|---|---|---|
| Control | 1.00 | 0.00 |
| Polyethylene | 1.63 | 0.14 |
| Graphite | 2.73 | 0.16 |

TABLE 9

Total time in contact/approach with
the plant as a function of fiber type

| Treatment | Time/Approach (seconds) | Standard error |
|---|---|---|
| Control | 1.50 | 0.22 |
| Polyethylene | 19.58 | 2.26 |
| Graphite | 29.20 | 3.57 |

TABLE 10

Proportion of unsuccessful
plant acquistions (repels) as a
function of fiber type

| Treatment | Proportion repelled | Standard error |
|---|---|---|
| Control | 0.00 | 0.00 |
| Polyethylene | 0.20 | 0.05 |
| Graphite | 0.63 | 0.05 |

TABLE 11

Increasing graphite fiber
density in the field reduces leaf damage

| Treatment | Mean leaf Damage ($cm^2$) | Standard error |
|---|---|---|
| Control | 12.21 | 4.16 |
| 1 × 5 | 10.46 | 3.24 |
| 3 × 5 | 3.99 | 0.66 |
| 6 × 5 | 2.97 | 0.58 |
| 9 × 5 | 2.54 | 0.30 |

TABLE 12

Increasing graphite fiber
density in the field reduces the
proportion of leaf damage

| Treatment | Proportion leaf damage | Standard error |
|---|---|---|
| Control | 0.47 | 0.14 |
| 1 × 5 | 0.46 | 0.15 |
| 3 × 5 | 0.16 | 0.04 |
| 6 × 5 | 0.11 | 0.02 |
| 9 × 5 | 0.09 | 0.01 |

TABLE 13

Under no choice conditions,
fiber density influence on a pest's total
time in contact with the fiber barrier

| Density | Total time | Total time standard error |
|---|---|---|
| Control | 2.44 | 0.34 |
| 1 × 5 | 29.32 | 7.16 |
| 2 × 5 | 41.95 | 8.68 |
| 3 × 5 | 88.14 | 18.88 |

TABLE 13-continued

Under no choice conditions,
fiber density influence on a pest's total
time in contact with the fiber barrier

| Density | Total time | Total time standard error |
|---|---|---|
| P1 × 5 | 16.76 | 2.88 |
| P2 × 5 | 104.60 | 19.99 |
| P3 × 5 | 57.25 | 13.33 |
| PVA | 42.05 | 6.94 |

TABLE 14

Under no choice conditions,
fiber density influence on the number
of pest approaches to the plant

| Density | Number of approaches | Number of approaches standard error |
|---|---|---|
| Control | 1.00 | 0.00 |
| 1 × 5 | 1.79 | 0.30 |
| 2 × 5 | 1.52 | 0.18 |
| 3 × 5 | 1.91 | 0.32 |
| P1 × 5 | 1.20 | 0.13 |
| P2 × 5 | 2.50 | 0.52 |
| P3 × 5 | 2.60 | 0.47 |
| PVA | 1.25 | 0.12 |

TABLE 15

Under no choice conditions,
fiber density marked influence on
time in had a contact/approach with fibers

| Density | Time/Approach | Time/Approach standard error |
|---|---|---|
| Control | 2.44 | 0.34 |
| 1 × 5 | 19.68 | 6.25 |
| 2 × 5 | 28.71 | 5.67 |
| 3 × 5 | 54.88 | 14.63 |
| P1 × 5 | 14.18 | 2.43 |
| P2 × 5 | 53.00 | 16.10 |
| P3 × 5 | 24.73 | 5.75 |
| PVA | 35.37 | 6.08 |

TABLE 16

Under no choice conditions, fiber
density influence on the proportion of
unsuccessful plant acquisitions (repels)

| Density | Proportion of Repels | Proportion of Repels standard error |
|---|---|---|
| Control | 0.00 | 0.00 |
| 1 × 5 | 0.63 | 0.11 |
| 2 × 5 | 0.67 | 0.11 |
| 3 × 5 | 0.67 | 0.11 |
| P1 × 5 | 0.36 | 0.10 |

TABLE 16-continued

Under no choice conditions, fiber density influence on the proportion of unsuccessful plant acquisitions (repels)

| Density | Proportion of Repels | Proportion of Repels standard error |
|---|---|---|
| P2 × 5 | 0.40 | 0.11 |
| P3 × 5 | 0.95 | 0.05 |
| PVA | 0.00 | 0.00 |

TABLE 17

Total time to the plant per insect as a function of fiber type

| Treatment | Total time (seconds) | Standard error |
|---|---|---|
| Control | 2.44 | 0.34 |
| Polyethylene | 56.25 | 8.63 |
| Graphite | 53.92 | 8.05 |
| PVA | 42.05 | 6.94 |

TABLE 18

Number of approaches to the plant per insect as a function of fiber type

| Treatment | Number of approaches | Standard error |
|---|---|---|
| Control | 1.00 | 0.00 |
| Polyethylene | 2.03 | 0.23 |
| Graphite | 1.74 | 0.16 |
| PVA | 1.25 | 0.12 |

TABLE 19

Time per approach to the plant as a function of fiber type

| Treatment | Mean time/ approach (seconds) | Standard error |
|---|---|---|
| Control | 2.44 | 0.34 |
| Polyethylene | 29.37 | 5.63 |
| Graphite | 34.91 | 5.97 |
| PVA | 35.37 | 6.08 |

TABLE 20

Fiber type (graphite) influence on proportion of unsuccessful plant acquisitions (repels)

| Treatment | Proportion Repelled | Standard error |
|---|---|---|
| Control | 0.00 | 0.00 |
| Polyethylene | 0.55 | 0.06 |
| Graphite | 0.66 | 0.06 |
| PVA | 0.00 | 0.00 |

TABLE 21

Under greenhouse choice conditions, fiber density influence on the total area of leaf damaged by an insect pest

| Treatment | Mean Leaf Damage ($cm^2$) | Standard error |
|---|---|---|
| Control | 3.11 | 0.78 |
| 3 × 5 | 0.89 | 0.34 |
| 6 × 5 | 0.97 | 0.30 |
| 9 × 5 | 0.69 | 0.50 |

TABLE 22

Under greenhouse choice conditions, fiber density influence on proportion of leaf damaged by an insect pest

| Treatment | Mean Proportion Leaf Damage | Standard error |
|---|---|---|
| Control | 0.44 | 0.07 |
| 3 × 5 | 0.15 | 0.06 |
| 6 × 5 | 0.17 | 0.06 |
| 9 × 5 | 0.07 | 0.04 |

TABLE 23

Graphite fiber density effect on the total area of leaf damaged by an insect pest

| Treatment | Mean Leaf Damage ($cm^2$) | Standard error |
|---|---|---|
| Control | 1.72 | 0.40 |
| 1 × 5 | 1.30 | 0.24 |
| 3 × 5 | 1.07 | 0.19 |
| 6 × 5 | 0.68 | 0.14 |
| 9 × 5 | 0.43 | 0.15 |

TABLE 24

Graphite fiber density effect on the proportion of leaf damaged by an insect pest

| Treatment | Proportion Leaf Damage | Standard error |
|---|---|---|
| Control | 0.44 | 0.07 |
| 1 × 5 | 0.40 | 0.07 |
| 3 × 5 | 0.32 | 0.06 |
| 6 × 5 | 0.24 | 0.05 |
| 9 × 5 | 0.09 | 0.03 |

TABLE 25

Fiber type influence on the time course of Flea Beetles in plant (raddish) acquisition (particularly at 20 and 30 minutes)

| Time (min.) | Control | Control Standard error | Graphite | Graphite Standard error | Polyethylene | Polyethylene Standard error | PVA | PVA Standard error |
|---|---|---|---|---|---|---|---|---|
| 0.00 | 0.00 | 0.00 | 0.00 | 0.00 | 0.00 | 0.00 | 0.00 | 0.00 |
| 10.00 | 0.50 | 0.17 | 0.16 | 0.09 | 0.20 | 0.08 | 0.25 | 0.10 |
| 20.00 | 1.20 | 0.36 | 0.36 | 0.15 | 0.04 | 0.04 | 1.20 | 0.28 |
| 30.00 | 1.20 | 0.39 | 0.32 | 0.14 | 0.20 | 0.10 | 1.35 | 0.28 |
| 40.00 | 1.50 | 0.40 | 0.48 | 0.17 | 1.20 | 0.24 | 0.75 | 0.18 |
| 50.00 | 1.30 | 0.30 | 0.40 | 0.17 | 0.60 | 0.19 | 0.70 | 0.22 |
| 60.00 | 1.90 | 0.62 | 0.84 | 0.22 | 0.72 | 0.21 | 1.05 | 0.18 |
| 90.00 | 1.90 | 0.46 | 1.04 | 0.21 | 0.96 | 0.36 | 0.90 | 0.20 |
| 120.00 | 1.80 | 0.47 | 1.00 | 0.25 | 1.08 | 0.36 | 1.15 | 0.20 |

TABLE 26

The influence of graphite fiber treatment on oviposition over a 24 hour period

| Treatment | Mean Oviposition | Standard error |
|---|---|---|
| Control | 18.60 | 6.09 |
| Polyethelene | 18.07 | 4.26 |
| Graphite | 3.87 | 1.84 |

TABLE 27

The effect of fiber type on the proportion of female pests ovipositing

| Treatment | Proportion Ovipositing-Total |
|---|---|
| Control | 0.87 |
| Polyester | 0.87 |
| Graphite | 0.40 |

TABLE 28

The effect of fiber type on the spatial pattern of egg deposition

| Treatment | Mean Oviposition Top | Top Standard error | Mean Oviposition Bottom | Bottom Standard error | Mean Oviposition Stem | Stem Standard error |
|---|---|---|---|---|---|---|
| Control | 7.67 | 3.04 | 10.73 | 3.92 | 0.20 | 0.15 |
| Polyethylene | 6.07 | 1.54 | 12.00 | 3.45 | 0.00 | 0.00 |
| Graphite | 1.27 | 0.57 | 2.00 | 1.13 | 0.60 | 0.60 |

TABLE 29

Increasing fiber density acts to change the pests' total oviposition on the plant

| Treatment | Total Number Eggs | Standard error |
|---|---|---|
| Control | 42.79 | 11.76 |
| 1 × 5 | 25.79 | 11.05 |
| 3 × 5 | 14.64 | 10.60 |
| 6 × 5 | 2.07 | 1.18 |
| 9 × 5 | 0.86 | 0.49 |

TABLE 30

Increasing fiber density acts to change the pests' ability to lay eggs on the plant

| Treatment | Total number of eggs | Standard error |
|---|---|---|
| 1 × 5 | 14.07 | 8.44 |
| 3 × 5 | 4.21 | 3.56 |
| 6 × 5 | 1.64 | 1.15 |
| 9 × 5 | 0.36 | 0.29 |

TABLE 31

Fiber type affects oviposition in soil around the plant stem

| Distance (cm) | Control | Control Standard error | Polyethylene | Polyester Standard error | Graphite | Graphite Standard error |
|---|---|---|---|---|---|---|
| <1.25 | 4.73 | 1.65 | 2.80 | 1.06 | 0.07 | 0.07 |
| 1.26– | 0.13 | 0.09 | 0.40 | 0.21 | 0.27 | 0.18 |
| 2.50 | | | | | | |
| 2.60–3.00 | 0.07 | 0.07 | 0.07 | 0.07 | 0.07 | 0.07 |
| 3.10–3.50 | 0.00 | 0.00 | 0.07 | 0.07 | 0.47 | 0.47 |

TABLE 32

The proportion of pests oviposition within 1.25 cm of the stem as a function of fiber barrier type

| Treatment | Proportion Ovipositing-Total | Proportion Ovipositing-Inner |
|---|---|---|
| Control | 0.80 | 0.80 |
| Polyester | 0.53 | 0.40 |
| Graphite | 0.33 | 0.07 |

TABLE 33

Fiber type influence on egg deposition within 1.25 cm of the stem (laboratory trials)

| Treatment | Total number eggs (1.25 cm) | Standard error |
|---|---|---|
| Control | 5.60 | 3.64 |
| Polyethylene | 0.20 | 0.20 |
| Graphite | 0.00 | 0.00 |
| PVA | 0.40 | 0.40 |

TABLE 34

Increasing graphite fiber density influence on average ovipositio

| Distance (cm) | Control | Control Standard error | Low | Low Standard error | Medium | Medium Standard error | High | High Standard error |
|---|---|---|---|---|---|---|---|---|
| <1.25 | 4.09 | 1.64 | 1.18 | 0.99 | 0.46 | 0.46 | 0.18 | 0.12 |
| 1.26–2.50 | 0.73 | 0.24 | 0.64 | 0.34 | 0.46 | 0.25 | 0.00 | 0.00 |
| 2.60–3.00 | 0.64 | 0.28 | 0.18 | 0.12 | 0.09 | 0.09 | 0.00 | 0.00 |
| 3.10–5.5 | 1.00 | 0.56 | 0.27 | 0.20 | 0.55 | 0.28 | 0.09 | 0.09 |

TABLE 35

The effect of increasing fiber density on both total oviposition and oviposition with 1.25 cm of the stem

| Treatment | Proportion Ovipositing- Total | Proportion Ovipositing- Inner |
|---|---|---|
| Control | 1.00 | 1.00 |
| 3 × 5 | 0.66 | 0.23 |
| 6 × 5 | 0.38 | 0.00 |
| 9 × 5 | 0.23 | 0.18 |

TABLE 36

Fiber type effect on the proportion of oviposition on the silk of the corn plant

| Treatment | Proportion of eggs on Silks | Standard error |
|---|---|---|
| Control | 0.65 | 0.13 |
| Polyethylene | 0.33 | 0.12 |
| graphite | 0.14 | 0.08 |
| Jute | 0.30 | 0.11 |

TABLE 37

In the greenhouse, the effect of graphite fiber density on mean oviposition by Silverleaf Whiteflies on squash plant

| Treatment | Total # of eggs | Standard error |
|---|---|---|
| Control | 24 | 5.31 |
| 3 × 5 | 11.5 | 2.79 |
| 6 × 5 | 8.6 | 2.62 |
| 9 × 5 | 4.8 | 1.89 |

TABLE 38

The effect of spun sucrose on total mean oviposition by Silverleaf Whiteflies on squash plant

| Treatment | Total # of eggs | Standard error |
|---|---|---|
| Untreated | 24.467 | 2.882 |
| Sugar | 5.867 | 1.964 |

TABLE 39

The effect of PVA on the mean amount and location of oviposition by Silverleaf whiteflies on squash plant

| Plant/Leaf | Control | Control Standard error | PVA | PVA Standard error |
|---|---|---|---|---|
| Plant | 62.1 | 11.559 | 39.7 | 6.53 |
| True Leaves | 53.3 | 10.519 | 6.2 | 4.046 |
| Cotyledons | 7.6 | 2.172 | 33.3 | 6.603 |

TABLE 40

Effect of fiber treatments on mean total imported cabbageworm oviposition

| Treatment | Mean Total # of eggs | Standard error |
|---|---|---|
| EVA | 4.8 | 3.6 |
| Black polyester | 14.2 | 3.7 |
| Graphite | 17 | 6.2 |
| Control | 27.4 | 4.8 |

TABLE 41

Effect of fiber treatments on mean imported cabbageworm leaf underside oviposition

| Treatment | Mean Total # of eggs | Standard error |
|---|---|---|
| EVA | 2.6 | 2.6 |
| Black polyester | 8.2 | 3.6 |
| Graphite | 13 | 5.4 |
| Control | 20 | 4.4 |

Literature Cited and Incorporated Herein by Reference:

1. Abacus Concepts, 1989, *Super ANOVA: accessible general linear modeling*. Abacus Concepts, Berkeley, Calif.
2. Brugger, K. E.; P. Nol, and C. L. Phillips., 1993, *Sucrose repellency to European starlings: will high-sucrose cultivars deter bird damage to fruit?*, Ecol. Appl. 3:256–261.
3. Burbutis, P. P., and Lesiewicz, D. S.; 1973. *Exclusion as a means of control of the European Corn Borer in Sweet Peppers*. J. Econ. Entomol. 67: 97–98.
4. Carruth, L. A., 1936, *Experiments for the control of larvae of Heliothis obsolete Fabr. On western Long Island during 1935*. J. Econ. Entomol. 29: 205–209.
5. Chalfant, R. B.; C. A. Jaworski; A. W. Johnson, and D. R. Summer, 1977, *Reflective film mulches, millet barriers, and pesticides: Effects on watermelon mosaic virus, insects, nematodes, soil-borne fungi, and yield of yellow summer squash*. J. Amer. Hort. Sci. 102: 11–15.
6. Clark, L., and J. R. Mason, 1993 *Interaction between sensory and post-gestional repellents in starlings: methyl anthranilate and sucrose*. Ecol. Appl. 3:262–270.
7. Conway, D. E.; B. D. McCraw; J. E. Motes; and J. L. Sherwood, 1989, *Evaluations of mulches and row covers to delay virus diseases and their effects on yield of yellow squash*. Applied Agricultural Res. 4: 201–207.
8. Fuller-Perrine, L. D. and M. E. Tobin. 1992. *A cost-effective method for applying and removing bird-exclusion netting in commercial vineyards*. Proc. East. Wildl. Damage Control Conf. 5:111.
9. Himelrick, D., *Battling the birds: the war without Mesurol*. East. Grape Grower and Winery News (Aug./Sept. 1985):22–25.
10. Hoffmann, M. P., L. T. Wilson and F. G. Zalorn. 1991a *Area-wide pheromone trapping of Helicoverpa zea and Heliothis phloxiphaga (Lepidoptera: Noctuidae) in the Sacramento and San Joaquin Valleys of California*. J. Econ. Entomol. 84: 902–911.
11. Hough-Goldstein, J. A. 1987. *Tests of spun polyester row cover as a barrier against seedcorn maggot (Diptera: Anthomyiidae) and cabbage pest infestations*. J. Econ. Entomol. 80: 768–772.

12. Martinez, del Rio, C. 1990. *Dietary, phylogenetic, and ecological correlates of intestinal sucrase and maltase activity in birds.* Physiol. Zool. 63:987–1011.
13. Mitchell, E. R. 1978. *Relationships of planting date to damage by corn earworms in commercial sweet corn in north central Florida*, Fla. Entomol. 61: 251–255.
14. Moyer, D. D. 1993. *New pifalls for the CPB.* pp. 94–95. In Proc. of the 1993 New York State Vegetable Conference. Syracuse, N.Y.
15. Oatman, E. R. 1966. *Parasitization of corn earworm eggs on sweet corn silk in southern California, with notes on larval infestations and predators.* J. Econ. Entomol. 59: 830–835.
16. Perring, T. M., R. N. Royalty, and C. A. Farrar. *Floating row covers for exclusion of virus vectors and the effect on disease incidence and yield of cantaloupe.* J. Econ. Entomol. 82: 1709–1715.
17. Pfadt, R. E. 1978. *Fundamentals of applied entomology.* MacMillan Publ. Co. New York. 798 pp.
18. Pike, K. S. and D. Allison. 1987. *Effects on two spotted spider mites of insecticides applied to sweet corn for control of corn earworn.* J. Agric. Entomol. 4: 327–332.
19. Schalk, J. M., C. S. Creighton, R. L. Fery, W. R. Sitterly, B. W. Davis, T. L. McFadden, and A. Day. 1979. *Reflective mulches influences insect control and yield in vegetables.* J. Amer. Hort. Sci. 104: 759–762.
20. Straub, R. W. and B. Emmett. 1992. *Pests of monocotyledon crops.* In R. G. McKinlay (ed.) Vegetable crop pests. CRC Press, Boca Raton, Fla. 406 pp.
21. Wells, O.S. and J. B. Loy. 1985. *Row covers for intensive vegetable production.* Univ. of New Hampshire, Cooperative Extension Service.
22. Yudin, L. S., B. E. Tabashnik, W. C. Mitchell, and J. J. Cho. 1991. *Effects of mechanical barriers on distribution of thrips (thysanoptera: Thripidae) in lettuce.* J. Econ. Entomol. 84: 136–139.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications and changes.

What is claimed is:

1. A method of reducing the damage done by agricultural pests, comprising the step of applying an effective amount of loosely arranged fiber onto or in the vicinity of an agricultural product or plant in situ such that said fiber thereby inhibits damage otherwise inflicted to said agricultural product or plant, wherein said method is used to reduce damage from agricultural pests selected from the group of insects consisting essentially of:
   a) insects in the order Coleoptera;
   b) insects in the order Lepidoptera;
   c) insects in the order Diptera;
   d) insects in the order Homoptera;
   e) insects in the order Isoptera;
   f) insects in the order Hemiptera;
   g) insects in the order Orthoptera; and
   h) insects in the order Thysanoptera.

2. The method of claim 1, wherein said method is used to reduce damage from agricultural pests selected from the group of insects consisting essentially of:
   a) Striped Cucumber Beetles (*Acalymma vittatum*);
   b) Spotted Cucumber Beetles (*Diabrotica undecimpunctata howardi*);
   c) Northern Corn Root Worms (*Diabrotica barberi*);
   d) Western Corn Root Worms (*Diabrotica virgifera*);
   e) Colorado Potato Beetle (*Leptinotarsa decemlineata*);
   f) Flea Beetles (Epitrix spp.);
   g) Diamondback Moth (*Plutella xylostella*);
   h) Corn Earworm (*Helicoverpa zea*);
   i) Cabbage Maggot (*Delia radicum*);
   j) Seed Corn Maggot (*Delia platura*);
   k) Onion Maggot (*Delia antiqua*);
   l) Cotton Bollworm (*Heliothis virescens*);
   m) Pink Bollworm (*Pectinophora gossypiella*);
   n) Silverleaf Whitefly (*Bemisia argentifolii*);
   o) Imported Cabbageworm (*Pieris rapae*); and
   p) Fungus Gnats (Mycetophilidae spp.).

3. A method of reducing the damage done by agricultural pests, comprising the step of apllying an efective amount of loosely arranged fiber onto or in the vicinity of an agricultural product or plant in situ such that said fiber thereby inhibits damage otherwise inflicted to said agricultural product or plant, further comprising the application of a multiplicity of fibers together with a sticking agent so as to protect a target fruit or structures of a target plant.

4. A method of reducing the damage done by agricultural pests, comprising the step of apllying an efective amount of loosely arranged fiber onto or in the vicinity of an agricultural product or plant in situ such that said fiber thereby inhibits damage otherwise inflicted to said agricultural product or plant, wherein said fiber consists of compounds which are visible to agricultural pests such that said agricultural pests are less likely to damage said plant or plant product due to said fiber's visible characteristics, wherein said fibers are visible to agricultural pests in the ultraviolet light region of the electromagnetic spectrum such that said fibers are capable of simulating the UV spectrum patterns of agricultural products upon which said agricultural pests feed or oviposit.

5. A method of reducing the damage done by agricultural pests, comprising the step of apllying an efective amount of loosely arranged fiber onto or in the vicinity of an agricultural product or plant in situ such that said fiber thereby inhibits damage otherwise inflicted to said agricultural product or plant, wherein said fiber consists of compounds which are visible to agricultural pests such that said agricultural pests are less likely to damage said plant or plant product due to said fiber's visible characteristics, wherein said fibers are visible to agricultural pests in the ultraviolet light region of the electromagnetic spectrum such that said fibers are capable of simulating the UV spectrum patterns of a plant species upon which target agricultural pests does not feed.

6. A method of reducing the damage done by agricultural pests, comprising the step of apllying an efective amount of loosely arranged fiber onto or in the vicinity of an agricultural product or plant in situ such that said fiber thereby inhibits damage otherwise inflicted to said agricultural product or plant, further comprising the step of applying a second compound useful in the reduction or control of agricultural pests, said second compound selected from a group essentially of:
   a) pesticides;
   b) insecticides;
   c) hormonal or chemical attractants for natural predators of the pest or pests to be inhibited or eliminated;
   d) sensory repellents for the pest or pests to be inhibited;
   e) hormonal or chemical repellents for the pest or pests to be inhibited; and f) biological control agents for the elimination or reduction of a given agricultural pest.

7. A method of reducing the damage done by agricultural pests, comprising the step of apllying an efective amount of loosely arranged fibers onto or around an agricultural product or plant in situ such that said fibers thereby inhibit damage otherwise inflicted to said agricultural product or plant, wherein the composition of said fibers is a plurality of different types of individual fibers, wherein said fibers consist of compounds which are visible to agricultural pests such that said agricultural pests are less likely to damage said plant or plant product due to said fibers' visible characteristics.

8. A method of reducing the damage done by agricultural pests, comprising the step of apllying an efective amount of loosely arranged fibers onto or around an agricultural product or plant in situ such that said fibers thereby inhibit damage otherwise inflicted to said agricultural product or plant, wherein the composition of said fibers is a plurality of different types of individual fibers, further comprising the application of a multiplicity of fibers together with a sticking agent so as to protect a target fruit or structures of a target plant.

9. The method of claim 7 wherein said fibers are visible to agricultural pests in the ultraviolet light region of the electromagnetic spectrum such that said fibers are capable of simulating the UV spectrum patterns of agricultural products upon which said agricultural pests feed or oviposits.

10. The method of claim 7 wherein said fibers are visible to agricultural pests in the ultraviolet light region of the electromagnetic spectrum such that said fibers are capable of simulating the UV spectrum patterns of a plant species which target agricultural pest does not feed.

11. A method of reducing the damage done by agricultural pests, comprising the step of apllying an efective amount of loosely arranged fibers onto or around an agricultural product or plant in situ such that said fibers thereby inhibit damage otherwise inflicted to said agricultural product or plant, wherein the composition of said fibers is a plurality of different types of individual fibers, further comprising the step of applying a second compound useful in the reduction or control of agricultural pests, said second compound selected from a group essentially of:

a) pesticides;

b) insecticides;

c) hormonal or chemical attractants for natural predators of the pest or pests to be inhibited or eliminated;

d) sensory repellents for the pest or pests to be inhibited;

e) hormonal or chemical repellents for the pest or pests to be inhibited; and f) biological control agents for the elimination or reduction of a given agricultural pest.

12. A method of reducing the damage done by agricultural pests, comprising the step of apllying an efective amount of loosely arranged fiber onto or in the vicinity of an agricultural product or plant in situ such that said fiber thereby inhibits damage otherwise inflicted to said agricultural product or plant, wherein said fiber consists of compounds which are visible to agricultural pests such that said agricultural pests are less likely to damage said plant or plant product due to said fiber's visible characteristics, wherein said fibers are visible to agricultural pests in the ultraviolet light region of the electromagnetic spectrum such that said fibers are capable of simulating the UV spectrum patterns of a non-plant material upon which target agricultural pests does not feed.

13. A method of reducing the damage done by agricultural pests, comprising the step of apllying an efective amount of loosely arranged fibers onto or around an agricultural product or plant in situ such that said fibers thereby inhibit damage otherwise inflicted to said agricultural product or plant, wherein the composition of said fibers is a plurality of different types of individual fibers, wherein said fibers are visible to agricultural pests in the ultraviolet light region of the electromagnetic spectrum such that said fibers are capable of simulating the UV spectrum patterns of a non-plant material upon which target agricultural pests does not feed.

* * * * *